United States Patent
Staudenmaier et al.

(10) Patent No.: US 10,558,599 B2
(45) Date of Patent: Feb. 11, 2020

(54) METHOD AND APPARATUS FOR LOADING A MATRIX INTO AN ACCELERATOR

(71) Applicant: NXP USA, Inc., Austin, TX (US)

(72) Inventors: Michael Andreas Staudenmaier, Munich (DE); Leonardo Surico, Haar (DE); Maik Brett, Taufkirchen (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/702,356

(22) Filed: Sep. 12, 2017

(65) Prior Publication Data

US 2019/0079885 A1 Mar. 14, 2019

(51) Int. Cl.
| | |
|---|---|
| *G06F 17/16* | (2006.01) |
| *G06T 15/00* | (2011.01) |
| *G06F 13/28* | (2006.01) |
| *G06F 7/523* | (2006.01) |

(52) U.S. Cl.
CPC .............. *G06F 13/28* (2013.01); *G06F 7/523* (2013.01)

(58) Field of Classification Search
None
See application file for complete search history.

(56) References Cited

U.S. PATENT DOCUMENTS

| | | | | |
|---|---|---|---|---|
| 7,536,487 B1 * | 5/2009 | Kohn | ..................... | H04N 19/61 345/503 |
| 8,296,350 B2 | 10/2012 | Li et al. | | |
| 8,543,626 B2 | 9/2013 | Li et al. | | |
| 8,612,723 B2 * | 12/2013 | Burkart | ............... | G06F 12/0207 711/217 |
| 2006/0140160 A1 * | 6/2006 | Vendel | .................. | H04W 24/02 370/337 |
| 2006/0206635 A1 * | 9/2006 | Alexander | .............. | G06F 13/28 710/22 |
| 2007/0073922 A1 * | 3/2007 | Go | .......................... | G06F 13/28 710/22 |
| 2009/0235049 A1 * | 9/2009 | Li | ........................... | G06F 17/16 712/30 |
| 2011/0320768 A1 * | 12/2011 | Pell | ........................ | G06F 12/16 712/30 |

(Continued)

FOREIGN PATENT DOCUMENTS

| | | |
|---|---|---|
| CN | 2008186073 | 3/2008 |
| CN | 101533386 A | 9/2009 |

OTHER PUBLICATIONS

"Type of Matrix", 2005, www.onlinemathlearning.com, 2 (Year: 2005).*

(Continued)

*Primary Examiner* — Hyun Nam (57) ABSTRACT

An apparatus for performing a method for loading a matrix into an accelerator includes an augmented direct memory access controller reading a matrix, in a data stream, from a first memory associated with a system processor and sending the matrix, in the data stream, to a second memory associated with the accelerator. The method further includes the augmented direct memory access controller extracting individual matrix elements from the data stream as the data stream is being sent to the second memory and analyzing the extracted individual matrix elements to determine if the matrix is any of a plurality of tested matrix class types as the data stream is being sent to the second memory.

20 Claims, 6 Drawing Sheets

(56) References Cited

U.S. PATENT DOCUMENTS

| | | | |
|---|---|---|---|
| 2012/0296950 A1* | 11/2012 | Li | G06F 17/16 708/520 |
| 2013/0262538 A1* | 10/2013 | Wegener | H03M 7/30 708/203 |
| 2014/0289445 A1 | 9/2014 | Savich | |
| 2016/0110113 A1* | 4/2016 | Rangachari | H03M 7/30 711/154 |
| 2018/0349290 A1* | 12/2018 | Staudenmaier | G06F 12/1081 |

OTHER PUBLICATIONS

Eberly, Wayne, "Selecting Algorithms for Black Box Matrices : Checking for Matrix Properties That Can Simplify Computations", International Symposium on Symbolic and Algebraic Computation, Jul. 20, 2016, pp. 207-214.

Yzelman et al., "Extended Matrix-Market File Format—An Extension to the Standard Scheme", White Paper, Nov. 1, 2010, pp. 1-11, retrieved from the Internet: https://www.staff.science.uu.nl/-bisse101/Mondriaan/Docs/extendedMM.pdf on Feb. 19, 2019.

\* cited by examiner

FIG. 1

$$B = \begin{bmatrix} b_{11} & b_{12} & \cdots & b_{1j} & \cdots & b_{1n} \\ b_{21} & b_{22} & \cdots & b_{2j} & \cdots & b_{2n} \\ \vdots & \vdots & & \vdots & & \vdots \\ b_{i1} & b_{i2} & \cdots & b_{ij} & \cdots & b_{in} \\ \vdots & \vdots & & \vdots & & \vdots \\ b_{m1} & b_{m2} & \cdots & b_{mj} & \cdots & b_{mn} \end{bmatrix}$$

METHOD AND APPARATUS FOR LOADING A MATRIX INTO AN ACCELERATOR

FIELD

The present disclosure relates generally to computational computing involving accelerators and more particularly to loading a matrix into a memory associated with an accelerator.

BACKGROUND

An accelerator helps increase the efficiency of a computer performing a computational task. This can occur in one or a combination of two ways. First, the accelerator shares the computational burden of performing the task with a system processor of the computer, therefore dividing the work load. Second, the accelerator assumes the entire computational load of performing the task, where the accelerator is configured to perform the task with greater efficiency than the system processor. To be most effective in the second case, accelerators are usually optimized for performing specific computational tasks. In some instances, accelerators perform mathematical operations involving matrices.

In performing matrix operations, an accelerator can employ two types of algorithms. General algorithms work for a wide range of matrix types but come with the price of reduced computational efficiency as compared to specialized algorithms. Specialized algorithms, while computationally more efficient, are only compatible with certain matrix types. To determine whether or not a specialized algorithm can be used, an accelerator performs a battery of tests upon one or more matrices involved in a matrix operation.

Each test on a matrix adds to the computational overhead of performing the matrix operation, taking away from the efficiency of using a specialized algorithm. Additionally, tests are performed in serial, which further reduces any efficiency gained from using a specialized algorithm. When the accelerator cannot match the one or more matrices involved in a matrix operation with any tested matrix type for which a specialized algorithm could be used, a general algorithm is used. In such cases, the testing performed by the accelerator provides no return and actually results in an overall efficiency decrease for the matrix operation as compared to using the general algorithm without testing.

BRIEF DESCRIPTION OF THE DRAWINGS

The accompanying figures, for which like reference numerals refer to identical or functionally similar elements throughout the separate views, together with the detailed description below, are incorporated in and form part of the specification. The figures serve to illustrate embodiments of concepts included in the claims and to show various features and advantages of those embodiments.

The present disclosure is illustrated in part with examples, as reflected by disclosed embodiments, and is not limited by the accompanying figures, in which like reference numbers indicate similar elements. Skilled artisans will appreciate that elements in the figures are illustrated for simplicity and clarity and have not necessarily been drawn to scale. For example, the dimensions of some of the elements in the figures may be exaggerated relative to the dimensions of other elements to help to improve understanding of embodiments implicitly or explicitly disclosed herein.

The apparatus and method components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Also, the operations included in the flow diagrams do not imply a required order in performing the functionality contained therein.

DETAILED DESCRIPTION

Described embodiments allow for an augmented direct memory access (DMA) controller to analyze a matrix while the matrix is being transferred from a system memory to a memory associated with an accelerator used to perform matrix operations. The augmented DMA controller analyzes the matrix to determine if the matrix belongs to one or more tested matrix class types. Results of the analysis are communicated to the accelerator to facilitate its performing matrix operations.

In accordance with one embodiment, a method for loading a matrix into an accelerator includes an augmented DMA controller reading the matrix, in a data stream, from a first memory associated with a system processor and sending the matrix, in the data stream, to a second memory associated with the accelerator. The method further includes the augmented DMA controller extracting individual matrix elements from the data stream as the data stream is being sent to the second memory and analyzing the extracted individual matrix elements to determine if the matrix is any of a plurality of tested matrix class types as the data stream is being sent to the second memory.

In accordance with another embodiment is an augmented DMA controller having a first part communicatively coupled to a first memory associated with a system processor and to a second memory associated with an accelerator. The first part of the augmented DMA controller reads a matrix, in a data stream, from the first memory and sends the matrix, in the data stream, to the second memory. The augmented DMA controller also has a second part communicatively coupled to the first part of the augmented DMA controller and to the accelerator. The second part of the augmented DMA controller extracts individual matrix elements from the data stream as the data stream is being sent to the second memory and analyzes the extracted individual matrix elements to determine if the matrix is any of a plurality of tested matrix class types as the data stream is being sent to the second memory. The second part of the augmented DMA controller also generates, based on the analyzing, a condition code for the matrix that indicates the matrix is at least one of the tested matrix class types or that indicates the matrix is none of the tested matrix class types and communicates the condition code for the matrix to the accelerator.

In a further embodiment, the second part of the augmented DMA controller includes a matrix element extractor communicatively coupled to the first part of the augmented DMA controller, wherein the matrix element extractor extracts the individual matrix elements from the data stream one element at a time based on the element memory size of the individual matrix elements.

In an additional embodiment, the second part of the augmented DMA controller further includes a matrix element identifier communicatively coupled to the matrix element extractor. The matrix element identifier receives, from the matrix element extractor, indications of the extracted individual matrix elements being extracted one element at a time, and determines, from the order of extraction and the dimensions of the matrix, the positions of the extracted individual matrix elements in the matrix.

In another embodiment, the second part of the augmented DMA controller also includes a matrix analyzer communicatively coupled to the matrix element extractor and to the matrix element identifier. The matrix analyzer receives the extracted individual matrix elements from the matrix element extractor and receives indications of the positions of the extracted individual matrix elements in the matrix from the matrix element identifier. The matrix analyzer further analyzes, based on a set of matrix element value deviation thresholds, the extracted individual matrix elements to determine if the matrix is any of the plurality of tested matrix class types and generates, based on the analyzing, the condition code for the matrix that indicates the matrix is at least one of the tested matrix class types or that indicates the matrix is none of the tested matrix class types. The matrix analyzer also communicates the condition code for the matrix to the accelerator.

Figure 1:
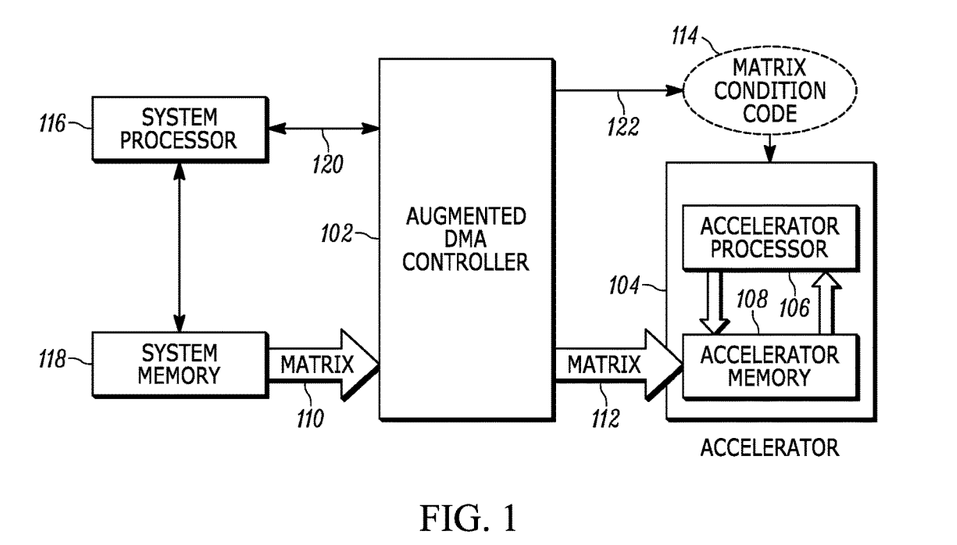
FIG. 1 shows a block system diagram that includes an augmented direct memory access controller, in accordance with described embodiments.

Referring now to the drawings, FIG. 1 shows a block diagram that includes an augmented DMA controller (ADMAC) 102 communicatively coupled to a computing system, having a system processor 116 and a system memory 118, and to an accelerator 104, having an accelerator processor 106 and an accelerator memory 108. In a number of embodiments, the accelerator 104 is a linear algebra accelerator. For other embodiments, the ADMAC 102 and/or the accelerator 104 are implemented as a system on chip (SoC). In some embodiments, the ADMAC 102 and the accelerator 104 are implemented on the same SoC.

An ADMAC is a device that allows for the testing of a matrix, to determine if the matrix is of one or more tested matrix class types, as the matrix is being transmitted or transferred from a memory associated with a system processor to a memory associated with an accelerator. An ADMAC as claimed and described herein represents an improvement over prior art DMA controllers in that the ADMAC extracts individual matrix elements from a data stream as the data stream is being sent to a memory associated with an accelerator. Further, the ADMAC analyzes the extracted individual matrix elements to determine if the matrix is any of a plurality of tested matrix class types as the data stream is being sent to the memory associated with the accelerator. Prior art DMA controllers do not perform this functionality. Analyzing the matrix elements as they are sent to the accelerator memory speeds up the process of determining whether a matrix operation may handled with a streamlined procedure in contrast to waiting until all the matrix elements have been sent to the accelerator memory before determining whether the streamlined procedure may be used.

Memory associated with a system processor, also referred to as system memory, is memory used exclusively or primarily by a system processor of computing system, wherein the system processor of the computing system uses an accelerator to perform some or all mathematical operations involving matrices. Memory associated with an accelerator, also referred to as accelerator memory, is memory used exclusively or primarily by an accelerator processor in performing mathematical operations involving matrices for a computer system having a system processor.

In a first embodiment, the system memory 118 is dynamic random access memory (DRAM). DRAM chips, for example, are located on one or more Rambus in-line memory modules (RIMMs), single in-line memory modules (SIMMs), or dual in-line memory modules (DIMMs). In a second embodiment, the accelerator memory 108 is static random access memory (SRAM). The SRAM, for example, is located on the same SoC as the accelerator processor 106. For different embodiments, the system memory 118 and the accelerator memory 108 can be of any type or configuration consistent with the system memory 118 and the accelerator memory 108 functioning in accordance with the teachings and embodiments disclosed herein.

In first embodiment, the system processor 116 is a complex instruction set computing (CISC) processor. The system processor 116, for instance, is an x86 processor (e.g., Intel-64 or AMD-64). In a second embodiment, the system processor 116 is a reduced instruction set computing (RISC) processor. The system processor 116, for example, is an advanced RISC machine (ARM) processor. In a third embodiment, the accelerator processor 106 is a single instruction, multiple data (SIMD) processor. In a fourth embodiment, the accelerator processor 106 is a very long instruction word (VLIW) processor. For different embodiments, the system processor 116 and the accelerator processor 106 can be of any type or configuration consistent with the system processor 116 and the accelerator processor 106 functioning in accordance with the teachings and embodiments disclosed herein.

Specifically, FIG. 1 shows the ADMAC 102 reading a matrix from the system memory 118 in a data stream 110 and sending the matrix to the accelerator memory 108 in a data stream 112. For some embodiments, the data streams 110 and 112 represent the same data steam used to transfer the matrix from the system memory 118 to the accelerator memory 108. Use of the reference 110/112 implies a described embodiment can be implemented with either a single data stream or two separate data streams. The term "data stream," as used herein, refers to a flow of data representing a matrix over a communication link, for example, such as a data bus. The data flow is such that individual elements of the matrix are transmitted discreetly, on an element-by-element basis, either in series or in parallel, over a communication link having a single or multiple parallel data paths. FIG. 1 further shows a condition code 114 for a matrix being communicated, over a communication interface 122, from the ADMAC 102 to the accelerator 104. Also shown in FIG. 1 is a communication interface 120 between the system processor 116 and the ADMAC 102.

A communication interface, as used herein, refers to a communication link between separate devices or a point of communicative interaction between contacting devices. In various embodiments, communication interfaces allow for the transmission of data, commands, and/or address.

Figure 2:
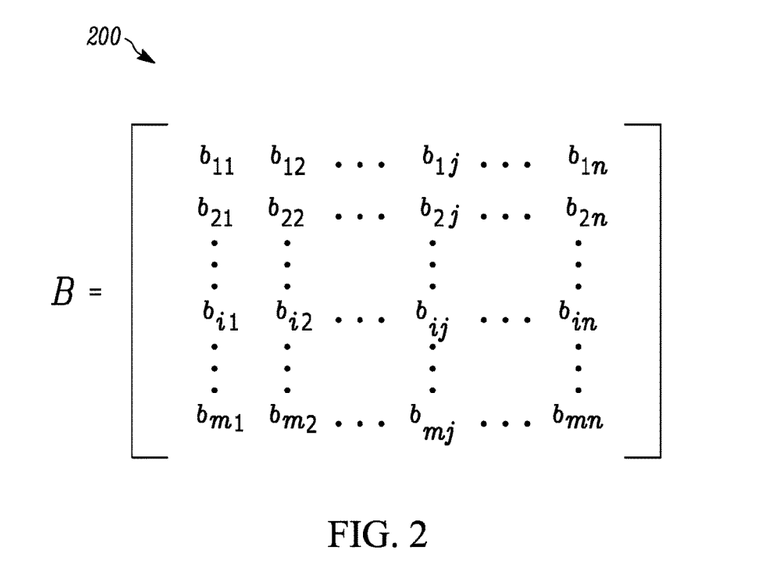
FIG. 2 shows a representation of a matrix, in accordance with some embodiments.

FIG. 2 shows a representation of a matrix B 200 in accordance with described embodiments. The illustrated representation is a two-dimensional array of matrix elements, $b_{ij}$, wherein each matrix element $b_{ij}$ has a numerical value that is real (e.g., x), imaginary (e.g., iy), or complex (e.g., x+iy). The variable indices i and j represent a position of a matrix element $b_{ij}$ in the two-dimensional array by row number and column number, respectively. Constants m and n indicate the dimensions of the matrix B 200, representing the number of rows and columns, respectively, in the two-dimensional array.

As used herein, the term "matrix" is defined broadly to include one-dimensional arrays (i.e., vectors) and arrays having two or more dimensions (i.e. tensors). A matrix A, for example, represents a one-dimensional column vector having elements $a_i$, and a matrix C represents a three-dimensional tensor having dimensions m, n, and p with elements $c_{ijk}$. For higher-dimensional matrices, tested matrix class types can include whether a matrix is an identity matrix or a null matrix with respect to a defined mathematical operation involving the higher-dimensional matrices.

Figure 3:
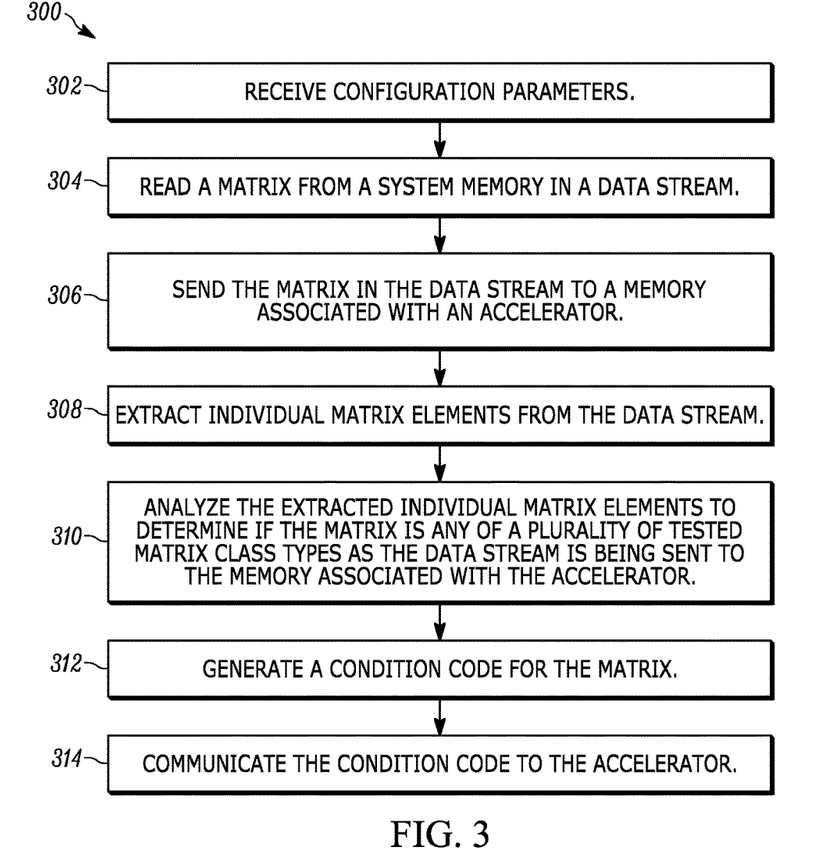
FIG. 3 shows a logical flow diagram illustrating a method of operation for an augmented direct memory access controller, in accordance with some embodiments.

FIG. 3 shows a method 300, illustrated as a logical flow diagram, for loading a matrix, taken to be the matrix B 200, into the accelerator 104. The method 300, which is performed by the ADMAC 102 and described with reference to FIG. 1, begins with the ADMAC 102 receiving 302 configuration parameters. The configuration parameters represent information used by the ADMAC 102 in performing the method 300. For example, the configuration parameters are initial settings used by the ADMAC 102 for loading the matrix B 200 into the accelerator 104. In one embodiment, the ADMAC 102 receives 302 the configuration parameters from the system processor 116 over the communication link 120. For other embodiments, the ADMAC 102 receives 302 the configuration parameters from another hardware component associated with the system processor 116. The configuration parameters can also be preprogrammed into the ADMAC 102 prior to the ADMAC 102 performing the method 300.

In a number of embodiments, the ADMAC 102 has at least one configuration register, wherein the at least one configuration register is configured with the configuration parameters the ADMAC 102 receives 302. The configuration registers, for example, map to memory spaces of a memory associated with the ADMAC 102. For some described embodiments, the at least one configuration register of the ADMAC 102 is configured with an element memory size of individual matrix elements of a matrix, an order of extraction for the individual matrix elements of the matrix, dimensions of the matrix, and/or a set of matrix element value deviation thresholds. For an embodiment, the ADMAC 102 receives 302 the configuration parameters in a configuration file. In other embodiments, the ADMAC 102 receives 302 from the system processor 116 additional configuration parameters, which include, but are not limited to: the address of the matrix B 200 in the system memory 118, a transfer mode (e.g., byte access, 16 bit word access, or burst mode), and a destination address for the matrix B 200 in the accelerator memory 108.

The method 300 continues with the ADMAC 102 reading 304 the matrix B 200 from the system memory 118, in the data stream 110, and sending 306 the matrix B 200 to the accelerator memory 108, in the data stream 112. The data streams 110 and 112 represent a transfer of the matrix B 200 on an element-by-element basis over a period of time. The period of time depends on factors such as the dimensions of the matrix B 200, the element memory size of individual matrix elements of the matrix B 200, and the speed at which the matrix B 200 is being transferred over one or more data paths within the data streams 110 and 112.

Where the transfer of the matrix B 200 is direct from the system memory 118 to the accelerator memory 108, the data streams 110 and 112 represent the same data stream. Where the transfer of the matrix B 200 is directed through one or more intermediary hardware components between the system memory 118 and the accelerator memory 108, the data streams 110 and 112 are distinguishable from one another. In such case, the data stream 110 represents the output from the system memory 118 and the input to the first intermediary hardware component, and the data stream 112 represents the output from the last intermediary hardware component and the input to the accelerator memory 108.

The method 300 continues with the ADMAC 102 extracting 308 individual matrix elements from the data stream 110/112 as the data stream 110/112 is being sent 306 to the accelerator memory 108. This means the individual matrix elements are extracted from the data stream 110/112 as the individual matrix elements are in transit between the system memory 118 and the accelerator memory 108. For some embodiments, the ADMAC 102 is configured with the element memory size of the individual matrix elements of the matrix B 200. Extracting the individual matrix elements from the data stream 110/112 is then based on the element memory size of the individual matrix elements. In one embodiment, configuring the ADMAC 102 with the element memory size of the individual matrix elements of the matrix B 200 includes the ADMAC 102 receiving 302 an indication of the element memory size of the individual matrix elements from the system processor 116.

Where the element memory size of the individual matrix elements of the matrix B 200 is 32 bits, for example, the ADMAC 102 extracts 32 bits from the data stream 110/112, wherein the extracted 32 bits represent an individual matrix element currently being transmitted in the data stream 110/112 from the system memory 118 to the accelerator memory 108. The next 32 bits the ADMAC 102 extracts 308 from the data stream 110/112 represents the next individual matrix element being transmitted. In this way, the ADMAC 102 extracts 308 the matrix B 200 from the data stream 110/112 element-by-element over the course of the matrix B 200 being transmitted from the system memory 118 to the accelerator memory 108.

For one embodiment, a matrix C is transmitted from the system memory 118 to the accelerator memory 108 after the matrix B 200 is transmitted, wherein the individual matrix elements of the matrix C have a different element memory size from the individual matrix elements of the matrix B 200. The individual matrix elements of the matrix C, for example, are complex with an element memory size of 64 bits. After the ADMAC 102 finishes sending 306 the matrix B 200 to the accelerator memory 108, and before the ADMAC 102 begins reading the matrix C from the system memory 118, the system processor 116 configures the ADMAC 102 with the new element memory size of the individual matrix elements of the matrix C. The system processor 116 uses the communication link 120, for instance, to initialize a configuration register of the ADMAC 102 so the ADMAC 102 properly extracts 64 bit matrix elements from the data stream 110/112 when the data steam 110/112 carriers the 64 bit individual matrix elements of the matrix C.

The method 300 continues with the ADMAC 102 analyzing 310 the individual matrix elements of the matrix B 200 extracted from the data stream 110/112 as the matrix B 200 is being sent to the accelerator memory 108. The ADMAC 102 analyzing 310 the extracted individual matrix elements to determine if the matrix B 200 is any of a plurality of tested matrix class types is based on the values of the extracted individual matrix elements and the positions of the extracted individual matrix elements in the matrix B 200. Analyzing 310 the extracted individual matrix elements to determine if the matrix B 200 is any of a plurality of tested matrix class types is performed on an element-by-element basis by determining if a current extracted individual matrix element is consistent with each of the plurality of tested matrix types before determining if a next extracted individual matrix element is consistent with each of the plurality of tested matrix types.

To determine the positions of extracted individual matrix elements, the ADMAC 102 is configured with the dimensions of the matrix B 200. In one embodiment, configuring the ADMAC 102 with the dimensions of the matrix B 200 includes the ADMAC 102 receiving 302 an indication of the dimensions of the matrix B 200 from the system processor 116, for instance, via the communication interface 120. In another embodiment, configuring the ADMAC 102 with the dimensions of the matrix B 200 includes the ADMAC 102 receiving 302 an indication of the dimensions of the matrix from reading a header for the matrix, wherein the header is stored with the matrix B 200 in the system memory 118. The header for the matrix B 200, for example, has the three numbers, "2," "10," and "10," stored with the matrix B 200 in the system memory 118. Here, the first number indicates the matrix B 200 is a two-dimensional matrix. The second number indicates the matrix B 200 has ten rows in the first dimension, and the third number indicates the matrix B 200 has ten columns in the second dimension. The ADMAC 102 reads these three numbers and configures its at least one configuration register with the dimensions of the matrix B 200 before extracting 308 the first individual matrix element for matrix B 200.

The ADMAC 102 also receives 302 an indication as to the order in which the individual matrix elements of the matrix B 200 are stored in the system memory 118, which controls the order in which the individual matrix elements are read 304 into the data stream 110/112 and extracted 308. Based on the dimensions of the matrix B 200 and the order in which the individual matrix elements are extracted 308, the ADMAC 102 determines the positions of the extracted individual matrix elements in the matrix B 200, for example, by row and column.

Figure 4:
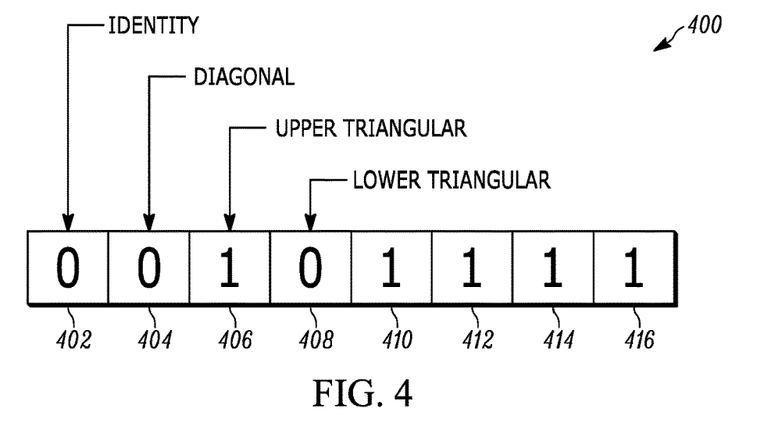
FIG. 4 shows a schematic diagram of a register used to represent a condition code for a matrix, in accordance with some embodiments.

The analyzing 310 of the extracted individual matrix elements is further described with reference to FIG. 4. FIG. 4 shows a schematic diagram of a register 400 used by the ADMAC 102 to represent or generate a condition code for the matrix B 200. The register 400 is described under the assumption that the matrix B 200 is square with the same number of columns as rows (i.e., m=n). In other embodiments, a register can represent or be used to generate condition codes for matrices that are not square or that have different numbers of dimensions.

For the embodiment shown, the register 400 has eight bits 402, 404, 406, 408, 410, 412, 414, 416, with each bit representing a flag which can be set (e.g., with a value of "1") or cleared (e.g., with a value of "0"). Each flag, in turn, represents one of a plurality of tested matrix class types. A matrix class type is a particular condition of a matrix that makes available for use a particular algorithm directed to performing a mathematical operation on or with the matrix that is different from a general algorithm that would otherwise be used to perform the operation. One example of a matrix class type is the identity matrix. The product, where the product is defined, of a matrix A with the identity matrix, for example, is simply the matrix A. Therefore, a different and much shorter algorithm can be used for obtaining a product of two matrices involving the identity matrix as compared to a general algorithm that would otherwise be used to determine the product of two matrices where neither matrix is the identity matrix.

FIG. 4 explicitly shows the register 400 representing a plurality of tested matrix class types, namely: an identity matrix, associated with the bit 402; a diagonal matrix, associated with the bit 404; an upper triangular matrix, associated with the bit 406; and a lower triangular matrix, associated with the bit 408. The remaining bits 410, 412, 414, 416 of the register 400 can represent different combinations of tested matrix class types in various embodiments. Other tested matrix class types might include, for example, symmetric, Hermitian, orthogonal, and unitary matrices. Each matrix class type is tested against the individual matrix elements the ADMAC 102 extracts 308 from the data stream 110/112 for the matrix B 200.

The ADMAC 102, for example, receives 302 an indication of a new square matrix from the system processor 116 over the communication interface 120. The ADMAC 102 begins reading 304 the matrix B 200, representing the new matrix, into the data stream 110/112 and extracts 308 from the data stream 110/112 the first individual matrix element $b_{11}$ of the matrix B 200. The ADMAC 102 determines that the value of the extracted individual matrix element $b_{11}$ is 5.2. The ADMAC 102 also determines that the position of the extracted individual matrix element $b_{11}$ is on the main diagonal of the matrix B 200. Because the matrix element $b_{11}$ is on the main diagonal and is not equal to unity, the ADMAC 102 determines the matrix B 200 cannot be the identity matrix. Accordingly, the ADMAC 102 clears a flag in the register 400 by changing the value of the bit 402, representing the identity matrix class type, from "1" to "0."

Other matrix class types the ADMAC 102 tests include the diagonal, upper triangular, and lower triangular class types, as indicated in FIG. 4. The ADMAC 102 determines that the extracted individual matrix element $b_{11}$ having a value of 5.2 does not exclude the possibility that the matrix B 200 is a diagonal, an upper triangular, or a lower triangular class type. Therefore, the ADMAC 102 leaves the bits 404, 406, and 408, representing these three tested matrix class types, respectively, set to "1."

Having received 302 an indication from the system processor 116 that the matrix B 200 is stored in the system memory 118 in a row-major order, the ADMAC 102 determines that the second individual matrix element it extracts 308 from the data stream 110/112 is the second matrix element of the first row of the matrix B 200, namely, the matrix element $b_{12}$. After determining that the value of the extracted individual matrix element $b_{12}$ is "−1.6" and that its position is off the main diagonal in the upper triangular portion of the matrix B 200, the ADMAC 102 determines that the matrix B 200 cannot be a diagonal or a lower triangular matrix. The ADMAC 102 therefore clears the bits 404 and 408 in the register 400 by setting the bits 404, 408 to "0." In this way, the ADMAC 102 performs multiple tests on the matrix B 200 concurrently, rather than sequentially, as the matrix B 200 is being transmitted from the system memory 118 to the accelerator memory 108.

For some embodiments, the ADMAC 102 is configured with a set of matrix element value deviation thresholds used in determining the values of extracted individual matrix elements of a matrix being tested against tested matrix class types. In one embodiment, configuring the ADMAC 102 with a set of matrix element value deviation thresholds includes the ADMAC 102 receiving 302 the set of matrix element value deviation thresholds from the system processor 116. The word "set," as used herein, implies one or more elements. Value deviation thresholds allow for an amount of numerical deviation when determining the values of extracted individual matrix elements.

The determination of a tested matrix being the identify matrix, for example, keys on whether main-diagonal elements have a value of unity while off-main-diagonal elements have a value of zero. Due to rounding errors caused by hardware and/or software components, however, a main-diagonal element might present a value of 0.999 to the ADMAC 102. Similarly, an off-main-diagonal element might present a value of 0.001. A value deviation threshold of ±0.01 would allow the ADMAC 102 to interpret these presented values as "1" and "0," respectively. A set of multiple value deviation thresholds allow for different thresholds on different values and/or allow for different plus and minus thresholds on the same value. In one embodiment, the set of matrix element value deviation thresholds is based on a desired accuracy of mathematical operations performed by the accelerator 104. For instance, the ADMAC 102 might interpret a tested matrix which is close to a tested matrix class type as belonging to the tested matrix class type so the accelerator 104 can implement a more-efficient algorithm, contingent upon whether the resulting computation performed by the accelerator 104 is within a predetermined accuracy tolerance.

After the ADMAC 102 extracts 308 and analyzes 310 all the individual matrix elements of the matrix B 200, any bits left set to "1" in the register 400 will indicate a matrix class type for the matrix B 200. In an alternate embodiment, setting rather than clearing a flag in the register 400 indicates exclusion of a tested matrix class type. In some cases, a tested matrix can be of more than one tested matrix class type. For example, a matrix can be both a diagonal matrix and the identity matrix. In other cases, a tested matrix does not conform to any tested class types.

The method 300 continues with the ADMAC 102 generating 312 the condition code 114 for the matrix B 200 and communicating 314 the condition code 114 to the accelerator 104. A condition code for a matrix is an indication that the matrix is at least one of the tested matrix class types, or that the matrix is none of the tested matrix class types. For some embodiments, generating a condition code includes clearing or setting a flag in a register indicating the matrix is inconsistent with a tested matrix types when determining the matrix is inconsistent with the tested matrix types. In a particular embodiment, the condition code 114 for the matrix B 200 is the register 400, the bit status of which the ADMAC 102 communicates 314 to the accelerator 104 over the communication interface 122. For other embodiments, the ADMAC 102 generates 312 the condition code 114 based on the register 400, wherein the condition code includes information encoded in the register when the ADMAC 102 completes its analysis of the extracted individual matrix elements. For example, the ADMAC 102 communicates 314 to the accelerator 104 the condition code 114, which indicates the matrix B 200 is an upper triangular matrix but which does not explicitly indicate tested matrix class types the ADMAC 102 excluded for the matrix B 200.

Upon receiving the condition code 114 for the matrix B 200, the accelerator 104 can use a specialized computational algorithm for a specific matrix class type when the condition code 114 indicates the matrix B 200 is of the specific matrix class type. Where the condition code 114 indicates the matrix B 200 is none of the tested matrix class types, the accelerator 104 uses a general algorithm. An exception to the accelerator 104 using the general algorithm might be when the computation being performed is a binary operation (e.g., matrix multiplication) involving the matrix B 200 and another matrix, where the ADMAC 102 determines the other matrix to be of a specific matrix class type. A list of mathematical operations the accelerator 104 can perform involving one or more matrices includes, but is not limited to, the product or sum of multiple matrices, the inverse or eigenvalues of a matrix, or solving a system of linear equations.

Figure 5:
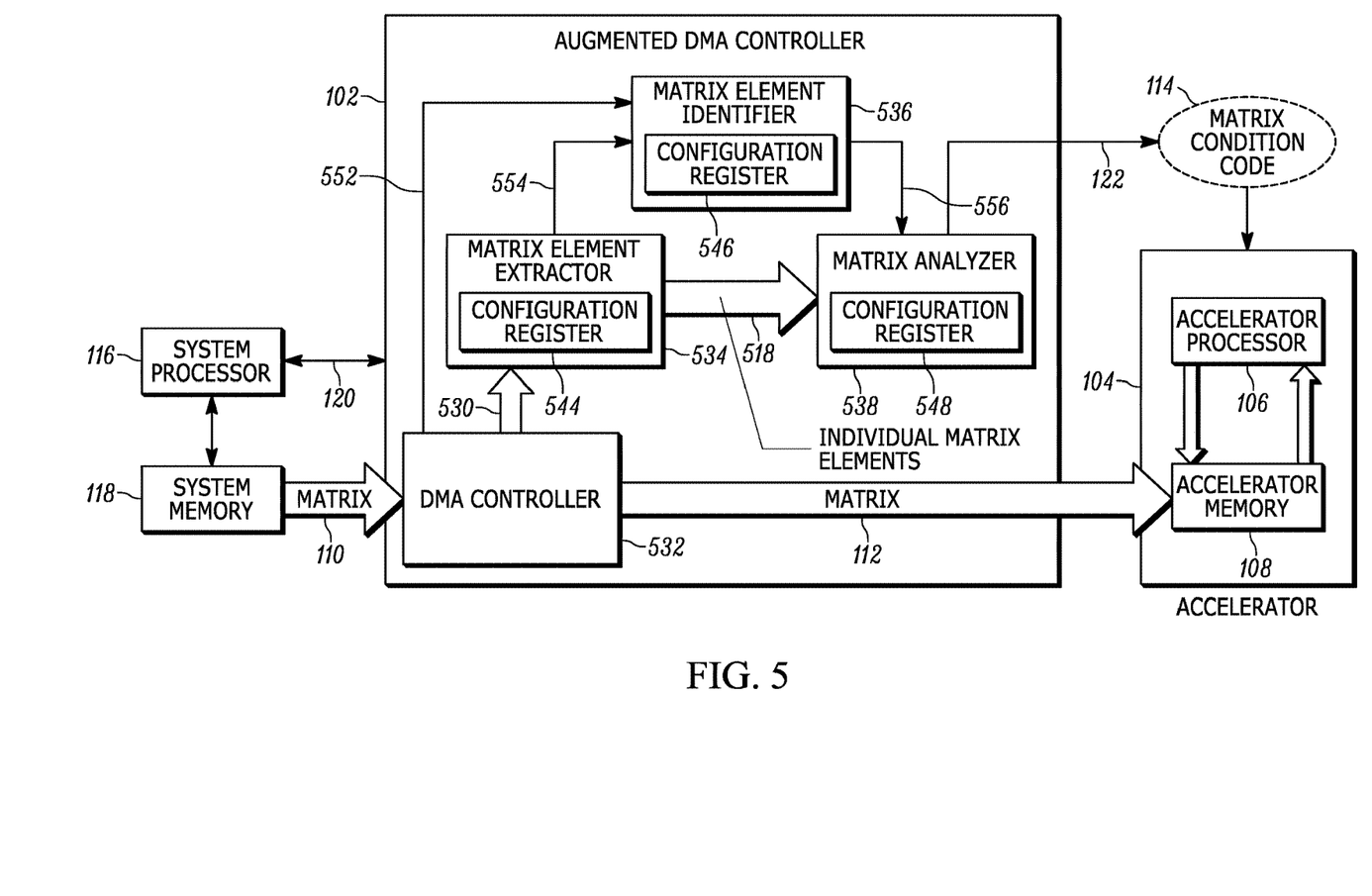
FIG. 5 shows a block system diagram that includes an augmented direct memory access controller, in accordance with some embodiments.

FIG. 5 shows the block system diagram of FIG. 1 with a possible combination of components within the ADMAC 102 consistent with the ADMAC 102 performing the method 300. Specifically, FIG. 5 shows the ADMAC 102 to include a DMA controller 532, a matrix element extractor (MEE) 534, a matrix element identifier (MEI) 536, and a matrix analyzer (MA) 538. The MEE 534, MEI 536, and MA 538, in turn, are each shown to include a configuration register, namely, the configuration registers 544, 546, and 548, respectively. Also shown is a communication interface 552 between the DMA controller 532 and the MEI 536, a communication interface 554 between the MEE 534 and the MEI 536, and a communication interface 556 between the MEI 536 and the MA 538. Communication interfaces 530 and 518, represented by wider arrows as opposed to lines, indicate the flow of extracted individual matrix elements.

A limited number of components 532, 534, 536, 538 are shown within the ADMAC 102 for ease of illustration. Other embodiments may include a lesser or greater number of components in the ADMAC 102. Moreover, other components needed for a commercial embodiment of the ADMAC 102 that incorporates the components 532, 534, 536, 538 shown for the ADMAC 102 are omitted from FIG. 5 for clarity in describing the following embodiments.

For some embodiments, the ADMAC 102 includes a processing element, not shown in FIG. 5, such as an application-specific integrated circuit (ASIC). This processing element, for instance, includes arithmetic logic and control circuitry necessary to facilitate the digital processing, in whole or in part, done by the ADMAC 102 in performing its functionality as described with reference to the methods 300 and 600-900.

In some embodiments, the components 532, 534, 536, 538 represent discrete components within the ADMAC 102. For other embodiments, two or more of the components 532, 534, 536, 538 are co-located with one another, forming single components with multi-component functionality. In a number of embodiments, the components 532, 534, 536, 538 represent logical components within the ADMAC 102. For several embodiments, the ADMAC 102 includes flip-flop or latch circuits used in building logic circuits that exceed in number a number of such circuits that defines the functionality of the DMA controller 532 alone. It is the additional logic circuits that represent the functionality of the MEE 534, MEI 536, and MA 538. Which logic circuits perform which functionality is determined, for example, by a logic synthesis tool or by how a computer program controlling the functionality is written and/or compiled. In one embodiment, register transfer language (RTL) is used to describe data flow at the register-transfer level of the ADMAC 102 architecture. The specific functionality of the components 532, 534, 536, 538 and their interaction with one another within the ADMAC 102 is described with reference to the reaming figures. The added functionality of the MEE 534, MEI 536, and MA 538 included within the ADMAC 102 represents an improvement over the functionality of the DMA controller 532 operating alone.

Figure 6:
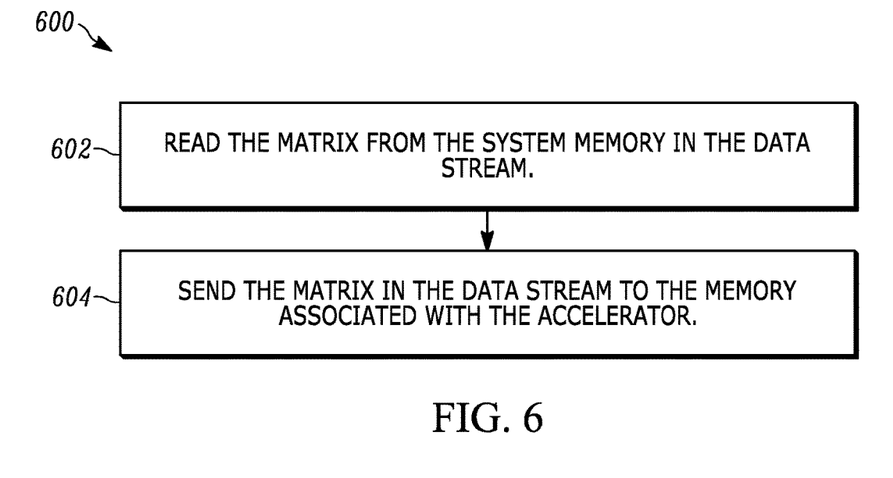
FIG. 6 shows a logical flow diagram illustrating a method of operation for a direct memory access controller of an augmented direct memory access controller, in accordance with some embodiments.
Figure 7:
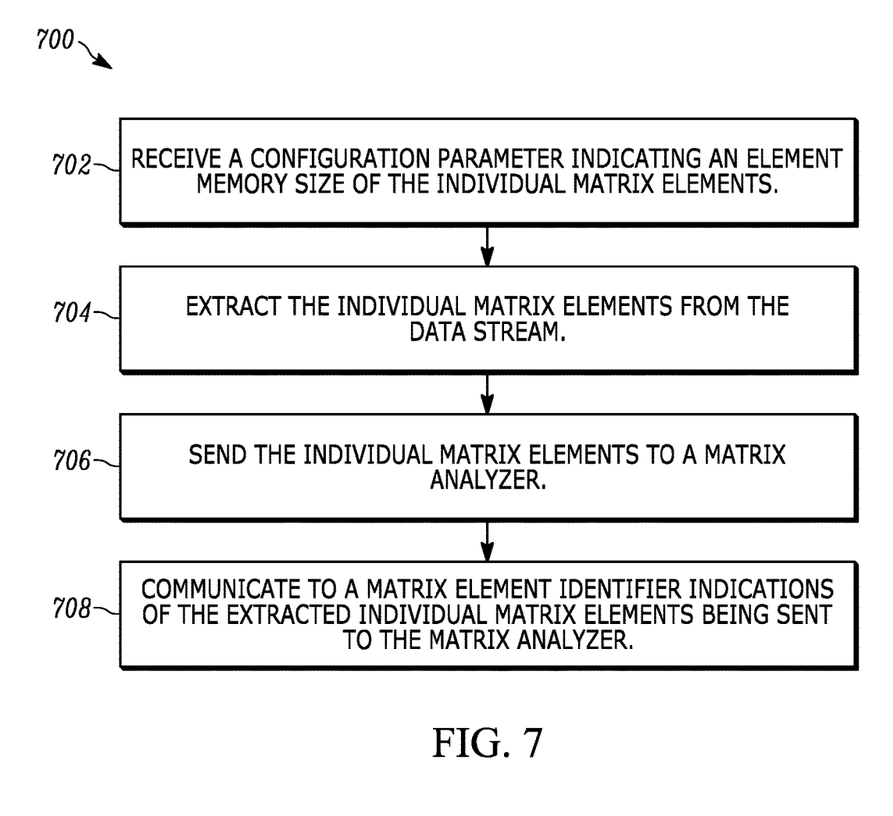
FIG. 7 shows a logical flow diagram illustrating a method of operation for a matrix element extractor of an augmented direct memory access controller, in accordance with some embodiments.
Figure 8:
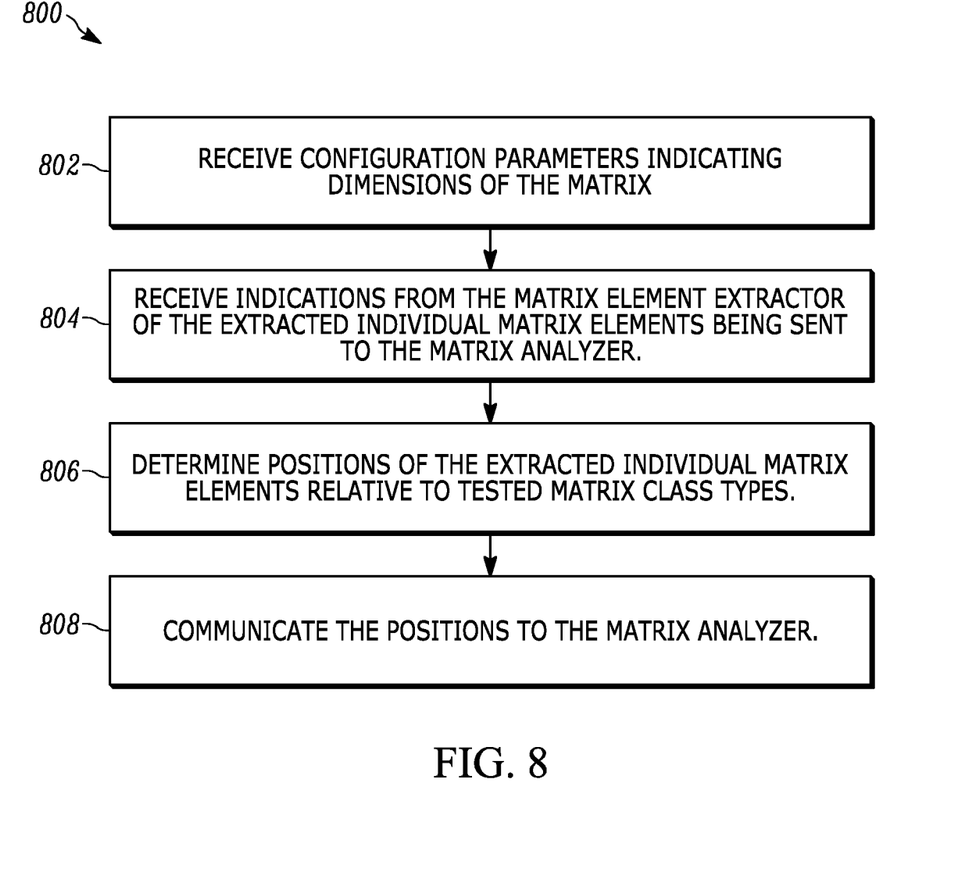
FIG. 8 shows a logical flow diagram illustrating a method of operation for a matrix element identifier of an augmented direct memory access controller, in accordance with some embodiments.
Figure 9:
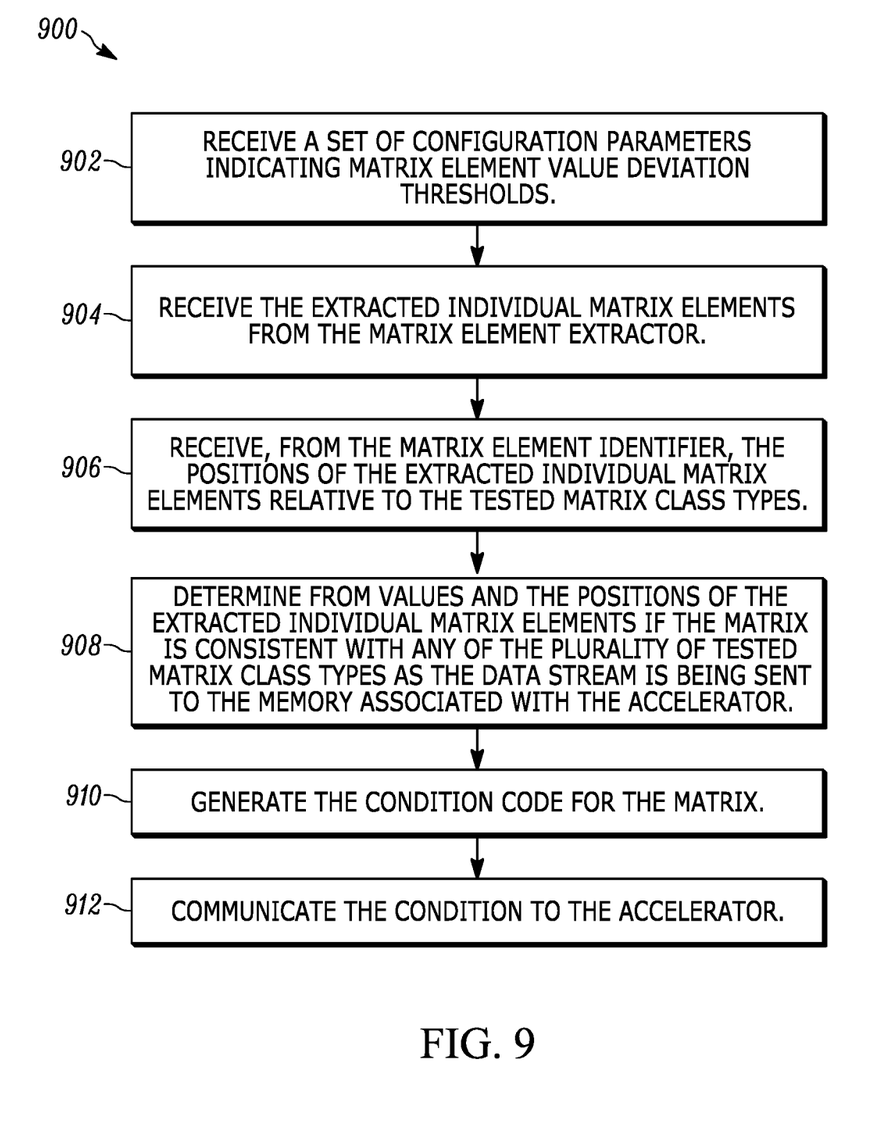
FIG. 9 shows a logical flow diagram illustrating a method of operation for a matrix analyzer of an augmented direct memory access controller, in accordance with some embodiments.

FIG. 6 shows a logical flow diagram illustrating a method 600 of operation for the DMA controller 532 of the ADMAC 102. In performing the method 600, the DMA controller 532 reads 602 the matrix B 200 into the data stream 110/112 and sends 604 the matrix B 200 in the data steam 110/112 to the accelerator memory 108. In a number of embodiments, the DMA controller 532 performs the function of a traditional DMA controller and represents the first part of the ADMAC 102. In some of these embodiments, the MEE 534, MEI 536, and MA 538, or the logic circuits which perform the functionality of these components as described with reference to FIGS. 7, 8, and 9, represent the augmented portion of the ADMAC 102, also referred to as the second part of the ADMAC 102. For a particular embodiment, the DMA controller 532 receives configuration parameters from the system processor 116 which include the address of the matrix B 200 in the system memory 118 and a destination address for the matrix B 200 in the accelerator memory 108.

FIG. 7 shows a logical flow diagram illustrating a method 700 of operation for the MEE 534 of the ADMAC 102. The method 700 begins with the MEE 534 receiving 702 a configuration parameter indicating the element memory size of the individual matrix elements of the matrix B 200. In one embodiment, the MEE 534 receives 702 the configuration parameter from the system processor 116 over the communication interface 120. For another embodiment, the DMA controller 532 receives the configuration parameter from the system processor 116 over the communication interface 120 and then sends the configuration parameter to the MEE 534. In a particular embodiment, the configuration parameter indicating the element memory size of the individual matrix elements of the matrix B 200 is used to configure the configuration register 544 of the MEE 534.

The method 700 continues with the MEE 534 extracting 704 the individual matrix elements of the matrix B 200 from the data stream 110/112 as the data stream is being sent to the accelerator memory 108. As shown, the MEE 534 receives the extracted individual matrix elements over the communication interface 530 from the DMA controller 532, through which the data stream 110/112 passes. In other embodiments, the MEE 534 extracts 704 the individual matrix elements of the matrix B 200 from the data stream 110/112 either directly of via another hardware component.

The MEE 534 sends 706 the extracted individual matrix elements to the MA 538 over the communication interface 518. The MEE 534 also communicates 708 over the communication interface 554 to the MEI 536 indications of the extracted individual matrix elements being sent to the MA 538. When the MEE 534 sends 706 the twelfth extracted individual matrix element of the matrix B 200 to the MA 538, for example, the MEE 534 communicates 708 to the MEI 536 that the twelfth matrix element is being sent or was sent to the MA 538. For an embodiment, this communication occurs before the MEE 534 sends the thirteenth extracted individual matrix element of the matrix B 200 to the MA 538.

FIG. 8 shows a logical flow diagram illustrating a method 800 of operation for the MEI 536 of the ADMAC 102. The method 800 begins with the MEI 536 receiving 802 configuration parameters indicating the dimensions of the matrix B 200. The configuration parameters indicate, for example, that the matrix B 200 is a square matrix having ten rows and ten columns (i.e., m=n=10). In some embodiments, the configuration parameters the MEI 536 receives 802 also indicate a row-major or a column-major order for the matrix B 200. In one embodiment, the MEI 536 receives 802 the configuration parameters from the system processor 116 over the communication interface 120. For another embodiment, the DMA controller 532 receives the configuration parameters from the system processor 116 over the communication interface 120 and then sends the configuration parameters to the MEI 536 over the communication interface 552. In a particular embodiment, the configuration parameters indicating the dimensions of the matrix B 200 are used to configure the configuration register 546 of the MEI 536.

The MEI 536 also receives 804 the communications sent 708 by the MEE 534 indicating the individual matrix elements sent 706 by the MEE 534 to the MA 538. For one embodiment, the MEI 536 receives 804 one such indication for every extracted individual matrix element the MEE 534 sends 706 to the MA 538.

The method 800 continues with the MEI 536 determining 806 the positions of the extracted individual matrix elements in the matrix B 200 relative to tested matrix class types and communicating 808 the positions to the MA 538 over the communication interface 556. When the MEI 536 receives 804 the communication from the MEE 534 that the twelfth extracted individual matrix element is being sent 706 or was sent 706 to the MA 538, the MEI 536 determines 806 the position of the twelfth matrix element based on the dimensions of the matrix B 200 and the order in which its matrix elements are read 602 into the data stream 110/112 and extracted 704. With a ten-by-ten matrix B 200 being stored in and read 602 from the system memory 118 in a row-major order, for example, the MEI 536 determines 806 that the twelfth extracted individual matrix element is the second matrix element in the second row of the matrix B 200. Therefore, the MEI 536 determines 806 that the twelfth extracted individual matrix element is positioned on the main diagonal of the matrix B 200 and relative to the tested matrix class types. The MEI 536 then communicates 808 the position to the MA 538 as the twelfth extracted individual matrix element being located on the main diagonal.

For some embodiments, as described above, the MEI 536 determines 806 and communicates 808 to the MA 538 the positions of extracted individual matrix elements relative to features of the tested matrix class types. For example, the MEI 536 determines 806 that the $17^{th}$, $23^{rd}$ and $64^{th}$ extracted individual matrix elements of the ten-by-ten matrix B 200 read in row-major order are in the upper triangular portion, on the main diagonal, and in the lower triangular portion, respectively, of the ten-by-ten tested matrix class types (and also of the matrix B 200). The MEI 536 then communicates 808 this position information to the MA 538.

In other embodiments, the MEI 536 determines 806 and communicates 808 to the MEI 536 the positions of extracted individual matrix elements relative to the dimensions of the matrix from which the matrix elements were extracted. For example, the MEI 536 determines 806 the positions of the 17$^{th}$, 23$^{rd}$ and 64$^{th}$ extracted individual matrix elements of the ten-by-ten matrix B 200 read in row-major order as (2,7), (3,3), and (7,4), respectively. Here, the first number and the second number in each ordered pair represent a row number and a column number, respectively, in the matrix B 200. The MEI 536 then communicates 808 this position information to the MA 538. In a number of embodiments, the MEI 536 determines from the received ordered pairs the positions of the extracted individual matrix elements relative to features of the tested matrix class types.

For some embodiments, the MEI 536 also receives an indication that a new matrix is being transmitted from the system memory 118 to the accelerator memory 108. In one embodiment, the MEI 536 receives this indication from the system processor 116 over the communication interface 120. In another embodiment, the MEI 536 receives this indication from the DMA controller 532 over the communication interface 552.

FIG. 9 shows a logical flow diagram illustrating a method 900 of operation for the MA 538 of the ADMAC 102. The method 900 begins with the MA 538 receiving 902 a set of configuration parameters indicating matrix element value deviation thresholds. In one embodiment, the MA 538 receives 902 the set of configuration parameters from the system processor 116 over the communication interface 120. For another embodiment, the DMA controller 532 receives the set of configuration parameters from the system processor 116 over the communication interface 120 and then sends the set of configuration parameters to the MA 538. In a particular embodiment, the set of configuration parameters indicating the matrix element value deviation thresholds are used to configure the configuration register 548 of the MA 538.

The method 900 continues with the MA 538 receiving 904 over the communication interface 518 the extracted individual matrix elements sent 706 by the MEE 534. The MA 538 also receives 906 over the communication interface 556 from the MEI 536 the positions of the extracted individual matrix elements relative to the tested matrix class types.

From the values and the positions of the extracted individual matrix elements, the MA 538 determines 908 if the matrix B 200 is consistent with any of the plurality of tested matrix class types as the data stream 110/112 is being sent 604 to the accelerator memory 108. The MA 538 makes this determination 908, for example, as described with reference to FIG. 3. Based on the determination 908, the MA 538 generates 910 the condition code 114 for the matrix B 200 and communicates 912 the condition code 114 to the accelerator 104 over the communication interface 122.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In this document, the terms "comprises," "comprising," "has," "having," "includes," "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. The terms "substantially," "essentially," "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

As used herein, the term "configured to," "configured with," "arranged to," "arranged with," "capable of" and any like or similar terms means that referenced elements have a physical arrangement and/or physical coupling and/or connectivity with other elements in an inactive state. This physical arrangement and/or physical coupling and/or connectivity while in the inactive state enables the elements to perform stated functionality while in the active state. Although the various circuit schematics shown herein depict certain example arrangement of elements, additional intervening elements, devices, features, or components may be present in an actual embodiment, assuming that the functionality of the given circuit is not adversely affected.

Also, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for loading a matrix in an accelerator circuit, the method comprising:
   in an augmented direct memory access controller:
      reading a matrix, in a data stream, from a first memory device accessible by a system processor;
      sending the matrix, in the data stream, to a second memory device in the accelerator circuit;
      extracting individual matrix elements from the data stream as the data stream is being sent to the second memory device;
      analyzing the extracted individual matrix elements to determine if the matrix is any of a plurality of tested matrix class types as the data stream is being sent to the second memory device; and
      when the matrix is one of the plurality of tested matrix class types, using an optimized operation corresponding to the one of the plurality of tested matrix class types in performing a requested operation with the matrix.

2. The method of claim 1 further comprising the augmented direct memory access controller communicating to the accelerator a condition code for the matrix that indicates:
   the matrix is at least one of the tested matrix class types; or
   the matrix is none of the tested matrix class types.

3. The method of claim 1, wherein the plurality of tested matrix class types comprises at least one of:
   an upper triangular matrix;
   a lower triangular matrix;
   a diagonal matrix; or
   an identity matrix.

4. The method of claim 1 further comprising configuring the augmented direct memory access controller with an element memory size of the individual matrix elements of the matrix, wherein extracting the individual matrix elements from the data stream is based on the element memory size of the individual matrix elements.

5. The method of claim 4, wherein configuring the augmented direct memory access controller with an element memory size of the individual matrix elements of the matrix comprises the augmented direct memory access controller receiving an indication of the element memory size of the individual matrix elements from the system processor.

6. The method of claim 4 further comprising configuring the augmented direct memory access controller with dimensions of the matrix.

7. The method of claim 6, wherein configuring the augmented direct memory access controller with dimensions of the matrix comprises the augmented direct memory access controller receiving an indication of the dimensions of the matrix from the system processor.

8. The method of claim 6, wherein configuring the augmented direct memory access controller with dimensions of the matrix comprises the augmented direct memory access controller receiving an indication of the dimensions of the matrix from reading a header for the matrix, wherein the header is stored with the matrix in the first memory.

9. The method of claim 6 further comprising determining, based on the dimensions of the matrix and an order of extracting the individual matrix elements, positions of the extracted individual matrix elements in the matrix.

10. The method of claim 9 further comprising receiving an indication of a new matrix from the system processor.

11. The method of claim 9 further comprising determining values of the extracted individual matrix elements of the matrix.

12. The method of claim 11 further comprising configuring the augmented direct memory access controller with a set of matrix element value deviation thresholds used in determining the values of the extracted individual matrix elements of the matrix.

13. The method of claim 11, wherein analyzing the extracted individual matrix elements to determine if the matrix is any of a plurality of tested matrix class types is based on the values of the extracted individual matrix elements and the positions of the extracted individual matrix elements in the matrix.

14. The method of claim 13, wherein analyzing the extracted individual matrix elements to determine if the matrix is any of a plurality of tested matrix class types is performed on an element-by-element basis by determining if a current extracted individual matrix element is consistent with each of the plurality of tested matrix types before determining if a next extracted individual matrix element is consistent with each of the plurality of tested matrix types.

15. The method of claim 14 further comprising generating a condition code for the matrix, wherein generating the condition code for the matrix comprises clearing or setting a flag in a register indicating the matrix is inconsistent with a tested matrix type of the plurality of tested matrix types when determining the matrix is inconsistent with the tested matrix type of the plurality of tested matrix types.

16. An augmented direct memory access controller comprising:
   a first part, communicatively coupled to a first memory accessible by a system processor and to a second memory in an accelerator, for reading a matrix, in a data stream, from the first memory and for sending the matrix, in the data stream, to the second memory;
   a second part, communicatively coupled to the first part of the augmented direct memory access controller and to the accelerator, for:
      extracting individual matrix elements from the data stream as the data stream is being sent to the second memory;

analyzing the extracted individual matrix elements to determine if the matrix is any of a plurality of tested matrix class types as the data stream is being sent to the second memory;

generating, based on the analyzing, a condition code for the matrix that indicates the matrix is at least one of the tested matrix class types or that indicates the matrix is none of the tested matrix class types;

communicating the condition code for the matrix to the accelerator; and the accelerator is configured to: when the matrix is one of the plurality of tested matrix class types, using an optimized operation corresponding to the one of the plurality of tested matrix class types in performing a requested operation with the matrix.

17. The augmented direct memory access controller of claim 16 further comprising at least one configuration register, wherein the at least one configuration register is configured with at least one of:

an element memory size of the individual matrix elements of the matrix;

an order of extraction for the individual matrix elements of the matrix;

dimensions of the matrix; and a set of matrix element value deviation thresholds.

18. The augmented direct memory access controller of claim 17, wherein the second part of the augmented direct memory access controller comprises a matrix element extractor communicatively coupled to the first part of the augmented direct memory access controller, wherein the matrix element extractor extracts the individual matrix elements from the data stream one element at a time based on the element memory size of the individual matrix elements.

19. The augmented direct memory access controller of claim 18, wherein the second part of the augmented direct memory access controller further comprises a matrix element identifier communicatively coupled to the matrix element extractor, wherein the matrix element identifier:

receives, from the matrix element extractor, indications of the extracted individual matrix elements being extracted one element at a time; and determines, from the order of extraction and the dimensions of the matrix, the positions of the extracted individual matrix elements in the matrix.

20. The augmented direct memory access controller of claim 19, wherein the second part of the augmented direct memory access controller further comprises a matrix analyzer communicatively coupled to the matrix element extractor and to the matrix element identifier, wherein the matrix analyzer:

receives, from the matrix element extractor, the extracted individual matrix elements;

receives, from the matrix element identifier, indications of the positions of the extracted individual matrix elements in the matrix;

analyzes, based on the set of matrix element value deviation thresholds, the extracted individual matrix elements to determine if the matrix is any of the plurality of tested matrix class types;

generates, based on the analyzing, the condition code for the matrix that indicates the matrix is at least one of the tested matrix class types or that indicates the matrix is none of the tested matrix class types; and communicates the condition code for the matrix to the accelerator.

* * * * *